US008843458B2

(12) United States Patent
Stampfl

(10) Patent No.: US 8,843,458 B2
(45) Date of Patent: Sep. 23, 2014

(54) METHOD AND ARRANGEMENT FOR AUTOMATICALLY SEARCHING INFORMATION SOURCES ACCESSIBLE THROUGH A DATA NETWORK

(75) Inventor: Norbert Stampfl, Vienna (AT)

(73) Assignee: Koninklijke Philips N.V., Eindhoven (NL)

( * ) Notice: Subject to any disclaimer, the term of this patent is extended or adjusted under 35 U.S.C. 154(b) by 147 days.

(21) Appl. No.: 10/554,230

(22) PCT Filed: Apr. 21, 2004

(86) PCT No.: PCT/IB2004/050473
§ 371 (c)(1),
(2), (4) Date: Oct. 25, 2005

(87) PCT Pub. No.: WO2004/098187
PCT Pub. Date: Nov. 11, 2004

(65) Prior Publication Data
US 2007/0124428 A1 May 31, 2007

(30) Foreign Application Priority Data
Apr. 28, 2003 (EP) .................................. 03101165

(51) Int. Cl.
*G06F 17/30* (2006.01)
(52) U.S. Cl.
USPC .......................................... 707/694; 707/758
(58) Field of Classification Search
USPC .................................................. 707/694, 758
See application file for complete search history.

(56) References Cited

U.S. PATENT DOCUMENTS

| 5,721,951 A | 2/1998 | Dorel |
| 5,777,989 A * | 7/1998 | McGarvey ..................... 370/254 |
| 6,073,170 A * | 6/2000 | Sumita et al. ................. 709/218 |
| 6,427,165 B1 * | 7/2002 | Anderson ...................... 709/217 |
| 6,694,339 B1 * | 2/2004 | Hirose et al. ........................... 1/1 |

(Continued)

FOREIGN PATENT DOCUMENTS

| JP | 200069452 A | 3/2000 |
| JP | 2002298613 A | 10/2000 |
| JP | 2002064807 A | 2/2002 |
| WO | WO03025933 | 3/2003 |

OTHER PUBLICATIONS

John De Vet & Vincent Buil, "A Personal Digital Assistant as an Advanced Remote Control for Audio/Video Equipment", Philips Research, 2000, pp. 87-91.

*Primary Examiner* — Son T Hoang
(74) *Attorney, Agent, or Firm* — Jones Day

(57) ABSTRACT

A method for automatically searching at least one information source accessible through a data network for contents that satisfy predefined criteria, which contents comprise useful information, such as stream of audio, video or news data, and metadata that characterizes the useful information, comprises: selecting an information source and receiving the metadata and analyzing it in respect of the predefined criteria. If the criteria are satisfied, the method includes processing the useful information received. If not, then for as long as the predefined criteria are not satisfied, generating a control signal and transmitting it to the information source to change the content supplied by the latter, and again receiving the metadata for the content supplied, and analyzing the metadata in respect of the predefined criteria.

13 Claims, 2 Drawing Sheets

(56) References Cited

U.S. PATENT DOCUMENTS

| | | | |
|---|---|---|---|
| 6,829,338 B2 * | 12/2004 | Gawande et al. | 379/112.1 |
| 7,321,923 B1 * | 1/2008 | Rosenberg et al. | 709/217 |
| 2001/0031066 A1 * | 10/2001 | Meyer et al. | 382/100 |
| 2002/0003840 A1 * | 1/2002 | Ueda et al. | 375/240.27 |
| 2002/0059215 A1 * | 5/2002 | Kotani et al. | 707/3 |
| 2002/0120925 A1 | 8/2002 | Logan | |
| 2002/0178276 A1 * | 11/2002 | McCartney et al. | 709/231 |
| 2003/0018799 A1 * | 1/2003 | Eyal | 709/231 |
| 2003/0028893 A1 * | 2/2003 | Addington | 725/115 |
| 2003/0037022 A1 * | 2/2003 | Adya et al. | 707/1 |

\* cited by examiner

METHOD AND ARRANGEMENT FOR AUTOMATICALLY SEARCHING INFORMATION SOURCES ACCESSIBLE THROUGH A DATA NETWORK

The invention relates to a method for automatically searching at least one information source accessible through a network, such as the internet, for contents that are supplied by this information source and satisfy predefined criteria, which contents comprise useful information, preferably streams of audio, video or news data, and metadata that characterizes the useful information, the information source changing the content supplied by it under the control of control signals.

The invention further relates to a search arrangement for automatically searching at least one information source accessible through a network, such as the internet, for contents that are supplied by this information source and satisfy predefined criteria, which contents comprise useful information, preferably streams of audio, video or news data, and metadata that characterizes the useful information, the information source changing the content supplied by it under the control of control signals.

It is known that radio and TV stations offer what is called "streaming content" for reception over the internet, this being radio or TV broadcasts whose contents can be processed in the receiving device even while the downloading is still taking place. The content of this "streaming content" comprises on the one hand useful information such as pieces of music, video films or news and on the other hand metadata which characterizes the useful information in detail. To enable such streaming content to be received, a user needs a radio or TV receiver having internet capabilities, or in general terms what is known as a consumer electronics device, or CE device for short. Depending on the way in which transmission takes place, a distinction is made between what is termed "internet radio" and what is termed "internet audio". Internet radio is the transmission of a given content to all the receivers over a channel selected by the receivers (=internet address), which is comparable to radio broadcasts that are broadcast from terrestrial or satellite antennas and are received by radio receivers by the selection of a given frequency. In the case of internet radio, all the users hear the same content at any given time. By contrast, in the case of internet audio a station offers a plurality of different contents at any given time, e.g. ten different pieces of music, from which a listener can make a selection. These different contents are generally organized into a list for reproduction—what is termed a "playlist" in the specialist jargon—which playlist sets a predefined sequence for the transmission of the contents. So, if a listener selects an internet audio channel, he will first receive a random content from the predefined playlist, which content is laid down for transmission at the time. Depending on the channel, the listener comes in part way through the transmission of a streaming content which is just being supplied or receives one of the contents predefined in the playlist from its beginning. Once the whole of this content has been transmitted, the next content contained in the playlist is transmitted over the channel, which means that, in time, the listener will receive all the contents contained in the playlist. The content comprises useful information and metadata, in which case the metadata may be embedded in the streaming content at one or more non-fixed points. The metadata may for example comprise details of the composer or interpreter of a piece of music or the genre of music to which it belongs, and also details of the title and length, etc. of the item constituting the useful information. To stop users from exiting the channel too soon because the contents on offer do not appeal to them, all that the stations will generally divulge is metadata on the content being transmitted at the time but not the whole playlist. Hence, without any interaction with the station via the receiver, the user would receive one content after another in the sequence provided for in the playlist. However, radio or TV stations of this kind do also have available to them receiving means by means of which a control signal generated by the CE device can be received over the internet, in which case whichever is the next content on the playlist is made available by the station, with the help of the control signal, for transmission to the CE device that generated the control signal.

In the internet receivers known to date for streaming content (CE devices), there is a search mode provided that allows a change to be made (tuning) from one channel to the next and that checks the metadata received from the given channel for whether it satisfies certain criteria, i.e. whether the useful information received corresponds to certain desired contents.

However, in the case of radio and TV stations that supply their contents under a playlist, this search mode fails in that only the metadata of the content that is being supplied at the time under the playlist can be checked, whereas the other contents on the playlist are not covered. At the present time, the only way of overcoming this problem is to stay on the given channel until the desired content appears by chance, which is obviously impracticable.

There are however also CE devices which have a "Next" button to be pressed by the user, by means of which a control signal can be generated for the transmitting station to cause, when there is a playlist, a move to be made from one content to the next on the selected channel, if the content that is available at the time is not acceptable to the user. However, this does involve the disadvantage that, when there is a playlist at the transmitting station, manual interaction by the user is required to get to the desired content or to establish that the channel does not offer it. This manual search is complicated and tedious for the user.

It is an object of the invention to provide a method of the kind specified in the first paragraph for automatically searching information sources accessible through a network, and a search arrangement of the kind specified in the second paragraph, in which the disadvantages specified above are avoided.

To allow the above-mentioned object to be achieved, features according to the invention are provided in a method according to the invention such that a method according to the invention can be characterized in the manner specified below, namely:

A method for automatically searching at least one information source accessible through a data network for contents that are supplied by this information source and satisfy at least one predefined criterion, which contents comprise useful information, and metadata that characterizes the useful information, the information source changing the content supplied by it under the control of control signals, comprising:
  selecting an information source,
  receiving at least a part of the content supplied by the information source selected, which part contains the metadata,
  analyzing the metadata in respect of the predefined criteria and,
  if the criteria are satisfied, processing the useful information received, and
  for as long as the at least one predefined criterion is not satisfied, generating a control signal and transmitting it to the information source to change the content supplied by the latter, and again receiving at least a part of the content supplied by the information source selected, which part contains the metadata, and analyzing the metadata in respect of the predefined criteria.

To allow the above-mentioned object to be achieved, features according to the invention are provided in a search arrangement according to the invention such that a search arrangement according to the invention can be characterized in the manner specified below, namely:

A search arrangement for automatically searching at least one information source accessible through a data network for contents that are supplied by this information source and satisfy at least one predefined criterion, which contents comprise useful information, and metadata that characterizes the useful information, the information source changing the content supplied by it under the control of a control signal, which search arrangement has receiving means that are arranged to select a connection to an information source and to receive useful information and metadata from the information source selected, and which search arrangement has analyzing means that are arranged to analyze the metadata received in respect of the at least one predefined criterion and, if the criterion is not satisfied, to generate and emit an activating signal that represents the non-satisfaction, and which search arrangement has processing means that are arranged to process the useful information received, and which search arrangement has control-signal generating means that are arranged to generate the control signal and transmit it to the information source to change the contents supplied by the information source, the control-signal generating means being so arranged that they can be activated by the analyzing means with the help of the activating signal.

What is achieved by the features according to the invention is that any desired internal channels from radio and TV stations, which channels have a playlist, can be searched for contents automatically, i.e. in background and in a way that is not noticeable and a nuisance to the user, which contents meet criteria lay down by the user, such for example as a given piece of music, genre or interpreter. The user does not have to perform any manual interaction with the receiver in this case. Nor do any additional data-processing steps have to be taken, of the kind that are known for example from the display on a computer of possible playlists that can be downloaded from a database, which once again calls for interaction by the user, or for the supply of playlists of this kind by means of an electronic programming guide (EPG).

Under the provisions of claim 2 and claim 8, the advantage is obtained that an information source does not have to be searched more than once for as long as it is offering the same contents.

Under the provisions of claim 3 and claim 9, the advantage is obtained that failure of the method can be avoided even when the channel that has just been selected does not offer metadata or offers metadata in a format that is not recognized.

Under the provisions of claim 4 and claim 10, the advantage is obtained that a plurality of information sources are searched automatically.

Under the provisions of claim 5 and claim 11, the advantage is obtained that unnecessary data traffic on the data network is avoided. Radio and TV stations generally change their playlists at fairly long intervals, e.g. every hour, which means that searching information sources of this kind at shorter intervals would only produce results that are already known anyway.

Under the provisions of claim 6, the advantage is obtained that the useful information can be stored on a data carrier without anything having to be done by the user. Provision may for example be made in this case for the useful information to be stored from its beginning while the associated metadata is still being analyzed, or for the arrival of the metadata to be awaited. If it is found when the metadata is analyzed that the useful information does not satisfy the predefined criteria, then the part of the useful information that has already been recorded is discarded.

Under the provisions of claim 8, the advantage is obtained that the criteria that the contents are to satisfy, and/or the information sources to be selected from, can be changed at any time.

These and other aspects of the invention are apparent from and will be elucidated with reference to the embodiment described hereinafter, to which the invention is not limited however.

Figure 1:
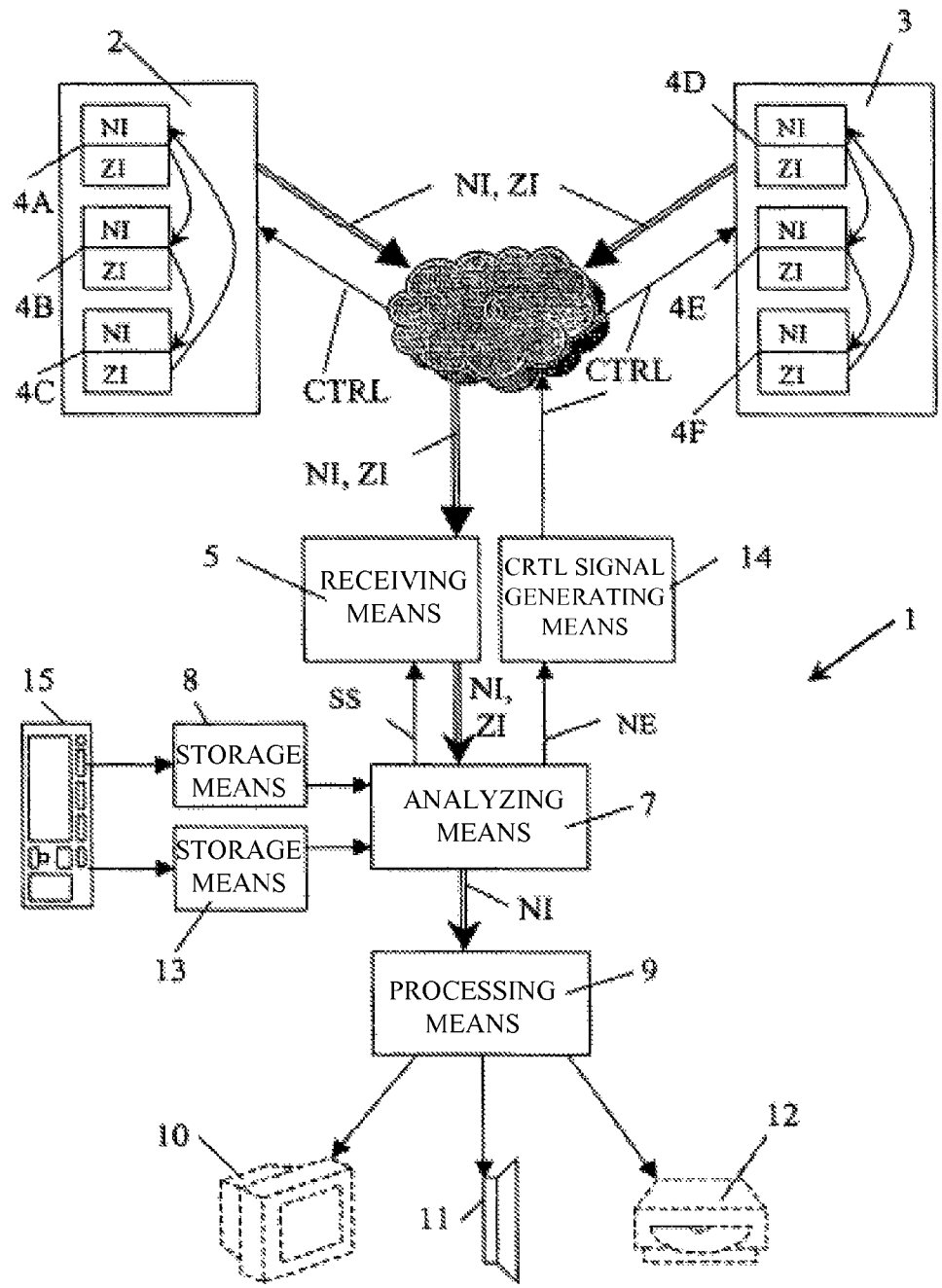
FIG. 1 is a block circuit diagram of a search arrangement according to the invention.

FIG. 1 shows, in the form of a block circuit diagram, a receiver (CE device) according to the invention having internet capabilities, for receiving audio data streams and having a search arrangement 1 according to the invention. The search arrangement 1 has receiving means 5 for connection to a data network 6 such as the internet. Also connected to the data network 6 are two information sources 2, 3, and it should be mentioned that the number of information sources may be as desired. The information sources 2, 3 are in the form of internet audio servers. It should be mentioned that the information sources 2 and 3 may also be in form of internet radio or TV stations or news servers. Hence it should be mentioned that the receiver and the search arrangement 1 may also be arranged to process video or audio/video or news data streams.

Each of the information sources has a plurality of contents 4A, 4B, 4C or 4D, 4E, 4F that are organized in the form of playlists. What this means is that the particular information source 2 or 3 successively changes the content that is being supplied at the time in a cycle, as indicated by the arrows between the individual contents. Contents 4A to 4F each comprise useful information NI, which can be emitted in the form of an audio data stream, and metadata ZI that corresponds to and characterizes the useful information NI. Where the data network 6 is the internet for example, the search arrangement 1 can connect itself to the information sources by selecting the internet address, i.e. the corresponding URL, of the particular information source 2 or 3. The selection of a suitable internet address is also referred to as channel selection. It should be mentioned that the data network 6 may also be a network other than the internet and that, when this is the case, addressing matched to the particular nature of the data network 6 is employed. As soon as the search arrangement 1 is connected to one of the information sources 2, 3, it receives via the receiving means 5 the content 4A to 4F that the selected information source 2, 3 is currently supplying, which content is transmitted as streaming content that comprises the particular useful information NI and the metadata ZI corresponding thereto.

The metadata ZI received by the receiving means 5 is fed to analyzing means 7 where it is analyzed in respect of compliance with predefined criteria that are stored in criteria storage means 8.

If the metadata ZI complies with the criteria, the useful information NI received is passed on to processing means 9 that convert the useful information NI to an appropriate data format to enable the useful information NI to be reproduced with the help of audio reproducing means 11. It should be mentioned that display means 10 and/or means 12 for recording the useful information may also be provided, in which case the latter means may contain or receive as data carriers storage media (not shown) such as, for example, hard disks, CD-RW's, etc. This means that the processing of the useful information includes the recording of this information on a data carrier of this kind.

If the metadata ZI does not comply with the criteria, the analyzing means 7 are arranged to generate and emit an activating signal NE representative of the non-compliance, by means of which control-signal generating means 14 are activated that then generate a control signal CTRL and pass it on via the data network 6 to the particular information source 2 or 3. On receipt of the control signal CTRL, the particular information source 2 or 3 supplies the next content scheduled in its playlist as streaming content for reception by the receiving means 5 of the search arrangement 1.

The analyzing means 7 are also connected to storage means 13 in which the addresses of the information sources 2 or 3 that can be selected by the search arrangement 1 are stored. The addresses may be defined as internet addresses, URL's or the like in this case. If none of the contents of a given information source 2 or 3 meets the predefined criteria, the analyzing means 7 fetch the address of another information source 2 or 3 from the storage means 13 and convey it to the receiving means 5 and the control-signal generating means 14 to instruct them to connect themselves to this new information source 2 or 3.

By means of input means 15, which are in the form of a keyboard in the present case but may also take the form of a mouse or a touch screen, the criteria in the criteria memory 8 and the addresses of the information sources 2 or 3 in the memory 13 can be changed, added to or deleted by a user.

The analyzing means 7 are further arranged to take into account an abort criterion, which is defined as repeated reception of the same metadata ZI from the same information source 2 or 3, the analyzing means 7 being arranged to terminate the analysis of the metadata ZI received from the selected information source 2 or 3 if this abort criterion is met.

The analyzing means 7 are further arranged to take into account an abort criterion which is defined as failure to receive metadata ZI from the information source 2 or 3 selected at the time within a predefined period of time or timeout, the analyzing means 7 being arranged to terminate their wait for the metadata ZI that is not received from the selected information source 2 or 3 during the said period, if this abort criterion is met.

The analyzing means 7 are further arranged to generate an information-source selecting signal SS and emit it to the receiving means 5 if the abort criterion is met. When the information-source selecting signal SS is present, the receiving means 5 are arranged to select an information source 3 or 2 other than the information source 2 or 3 that was selected when the criterion was met.

Provision is also made for the search arrangement 1 to be arranged, after the last available information source 3 or 2 has been selected and the abort criterion met, to discontinue its search of the information searches 2 and 3 accessible through the data network 6, or to suspend its search for an available information search 2 or 3 for a predefined period of time and then to continue it again.

Figure 2:
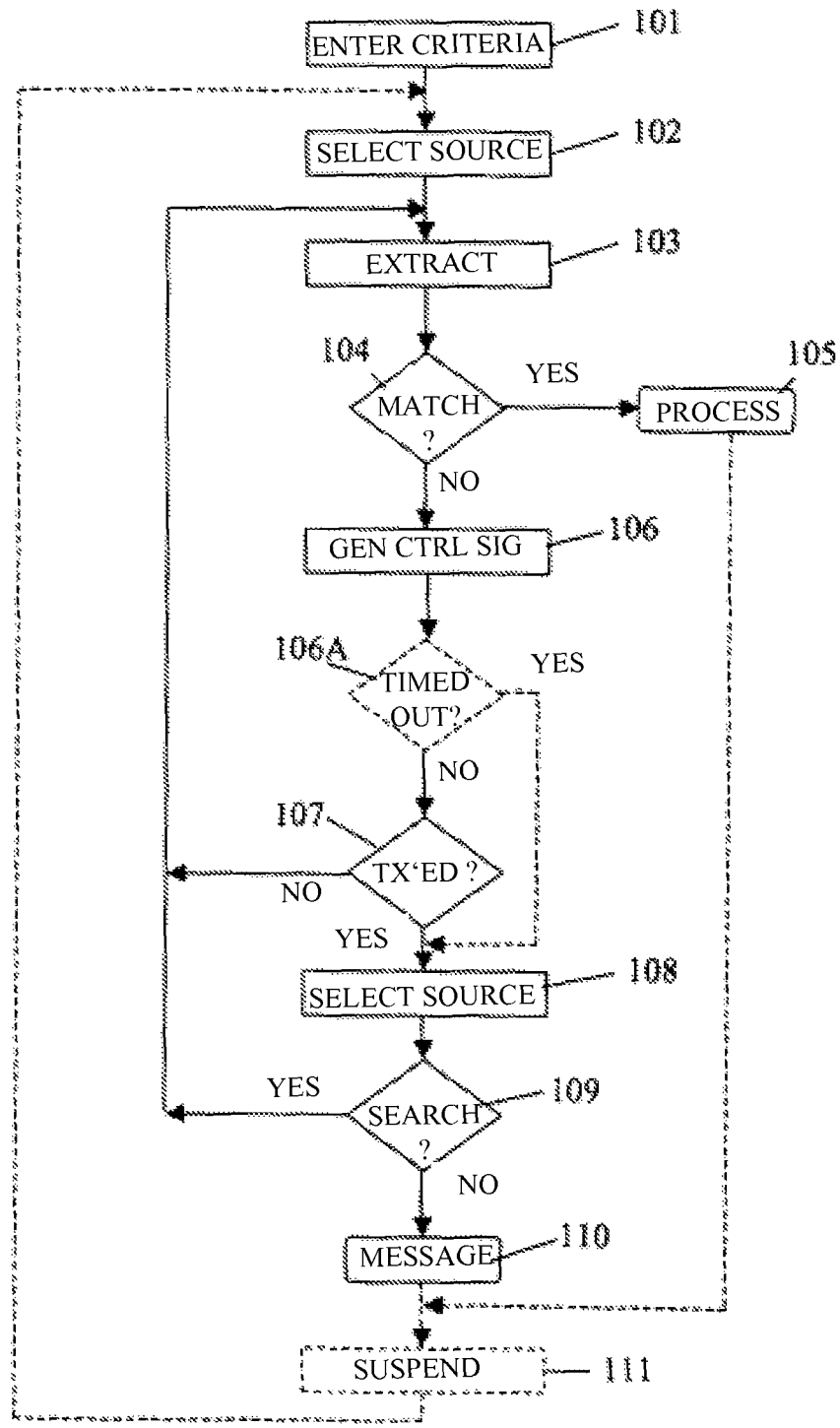
FIG. 2 is a flow chart of the course followed by the search method according to the invention.

Reference will now be made to FIG. 2, in which is shown, in the form of a flow chart, the method that can be executed in the search arrangement 1 for automatically searching information sources 2 and 3 accessible through the data network 6 for contents supplied by the said sources that satisfy predefined criteria. It will be assumed by way of example that the contents in question are a plurality of pieces of music that are supplied by the information sources 2 and 3, which are in the form of internet audio servers, in the form of respective playlists.

In a step 101, a user first enters the criteria for the desired pieces of music by means of the input means 15. Where these are not already available or cannot be found automatically by the search arrangement 1, the user also enters the addresses, i.e. the URL's, of the information sources 2 and 3 in which the desired pieces of music are to be searched for.

In a step 102, one of the information sources 2 and 3 is selected, the search arrangement 1 connecting itself to the information source 2 and receiving therefrom useful information NI in the form of a piece of music and, in a step 103, metadata ZI that describes the piece of music in detail.

In a step 104, an analysis is carried out to see whether the metadata received matches the criteria specified by the user. If it does, the piece of music is processed, i.e. reproduced, in a step 105. After the piece of music has been processed in step 105, a timeout may be provided as an option, after the expiry of which (step 111), the method is repeated as from step 102 to find further pieces of music that meet the criteria.

If the analysis at step 104 failed to find any correspondence between the criteria and the metadata, in step 106 the analyzing means 7 activate the control-signal generating means 14, by means of the activating signal NE, to generate the control signal CTRL and transmit it to the information source 2. If the latter is so configured that it responds to the control signal CTRL, it will transmit the next piece of music and its corresponding metadata to the search arrangement 1.

To stop the forward progress of the method from hanging up, i.e. the method from failing, if the information source 2 does not supply any contents, provision may be made, as an option, for the expiry of a timeout to be monitored (step 106A). If no information arrives from the selected information source 2 within the time set, the method is continued at a step 108. A new information source 3 is selected at step 108. Hence the failure to receive metadata ZI from the information source 2 forms a criterion for aborting, the other information source 3 being selected if the abort criterion is met.

If the search arrangement 1 receives the next piece of music and the embedded metadata before the timeout set expires, a check is made at step 107 to see whether the piece of music concerned is one that has already been transmitted previously by this information source 2. In other words, a check is made to see whether all the pieces of music on the playlist of this information source 2 have already been received. If the last piece of music transmitted is new, the method is continued at step 103. If all the pieces of music on the playlist of information source 2 have already been transmitted, the method is continued at a step 108. A new information source 3 is selected at step 108. Hence, the repeated reception of the same metadata ZI from the same information source 2 forms a criterion for aborting, the other information source 3 being selected if the abort criterion is met.

At a step 109, a check is then made to see whether the information source 3 that has now been selected may not be an information source that has already been searched previously. If that is not the case, the method is continued at step 103. If however it is the case, this means that all the information sources available have already been searched without success and the method is brought to an end—at least temporarily until it is restarted—by a message "Not found" being displayed to the user of the search arrangement at a step 110.

As an option, provision may also be made for the method not to be brought to an end but merely to be suspended for a predefined length of time (block 111), on expiry of which the method is continued again at step 102. Because the information sources 2 and 3 change their playlists regularly, the contents of the information sources 2 and 3 may have changed during the time when the method was suspended, and it is therefore possible that the desired contents are now available.

The invention claimed is:

1. A method for automatically searching at least one information source accessible through a data network, the method comprising acts of:
   selecting an information source supplying content from a plurality of information sources, wherein the content comprises useful information and metadata that characterizes the useful information;
   receiving a part of content supplied by the selected information source, wherein the part contains the metadata;
   analyzing the metadata in respect of predefined criteria;
   if the criteria are satisfied, processing the useful information;
   for as long as at least one of the predefined criteria is not satisfied:
      generating a control signal,
      transmitting the control signal to the selected information source to change the content supplied by the selected information source,
      receiving a part of the changed content supplied by the selected information source, wherein the part of the changed content contains changed metadata, and
      analyzing the changed metadata in respect of the predefined criteria;
   storing the useful information while the metadata associated with the useful information is still being analyzed, or while awaiting arrival of the associated metadata;
   discarding the stored useful information if the associated metadata indicates that the stored useful information does not satisfy the predefined criteria;
   repeating the generating and transmitting acts for as long as an abort criterion is not satisfied;
   repeatedly receiving a same metadata;
   determining that the same metadata is received from a same information source from among the plurality of information sources; and
   in response to the determining act, aborting the generating and transmitting acts, wherein the abort criterion is defined as repeated reception of the same metadata from the same information source, wherein after a last available information source has been selected and the abort criterion is met, discontinuing or suspending the searching for a predefined period of time, and then continuing with selection of another available information source other than the last available information source.

2. The method as claimed in claim 1, the processing act includes recording of the useful information on a data carrier.

3. The method of claim 1, wherein the selected information source streams the received content.

4. The method of claim 1, wherein the selected information source includes a plurality of contents that are organized as playlists.

5. A search arrangement for automatically searching at least one information source accessible through a data network, wherein the search arrangement comprises:
   means for selecting a connection to a selected information source from among a plurality of information sources and to receive content comprising useful information and metadata from the selected information source;
   means for analyzing the metadata received in respect of the at least one predefined criterion and, if the criterion is not satisfied, to generate and emit an activating signal that represents the dissatisfaction;
   means for processing the useful information received;
   means for generating and transmitting a control signal to the selected information source to change the content supplied by the selected information source, the means for generating and transmitting being arranged to be activated by the means for analyzing with the activating signal; and
   a computer memory for storing the useful information while the associated metadata is still being analyzed, or while awaiting arrival of the associated metadata, wherein
      the stored useful information is discarded if the associated metadata indicates that the useful information does not satisfy the at least one predefined criterion,
      the processing means being further arranged to perform a determination that a received same metadata is received from a same information source from among the plurality of information sources, and in response to the determination, abort processing the useful information, and
      the means for analyzing being arranged to take into account an abort criterion, the abort criterion being defined as repeated reception of the same metadata from the same information source, wherein after a last available information source has been selected and the abort criterion is met, discontinuing or suspending the searching for a predefined period of time, and then continuing with selection of another available information source other than the last available information source.

6. The search arrangement as claimed in claim 5, wherein if the abort criterion is met, the analyzing means being arranged to terminate the analyzing of the metadata received from the selected information source.

7. The search arrangement as claimed in claim 5, further comprising input means for input of the at least one predefined criterion for contents or information-source addresses.

8. The search arrangement as claimed in claim 5, wherein the means for processing being connected to display means, audio reproduction means, or means for recording the useful information.

9. The search arrangement of claim 5, wherein the selected information source includes an Internet music server.

10. The search arrangement of claim 5, wherein the means for receiving receives multiple different streaming content that is concurrently supplied by the information source.

11. A method for automatically searching at least one information source accessible through a data network, including acts of:
   receiving both audio data and corresponding metadata indicative of the audio data from an information source, wherein the information source streams the audio data and the metadata;
   determining whether the metadata matches user specified criteria;
   reproducing the audio data when the metadata matches the user specified criteria;
   generating and transmitting a control signal to the information source when the metadata does not match the user specified criteria, wherein the information source streams second audio data and second corresponding metadata indicative of the second audio data in response to the control signal, wherein the second audio data is different than the first audio data;

storing the audio data while the associated metadata associated with the audio data is still being analyzed, or while awaiting arrival of the associated metadata; and discarding the stored audio data if the associated metadata indicates that stored audio data does not satisfy the user specified criteria;

repeating the generating and transmitting acts for as long as an abort criterion is not satisfied;

repeatedly receiving a same metadata;

determining that the received same metadata is received from a same information source from among the plurality of information sources; and in response to the determining act, aborting the generating and transmitting acts, wherein the abort criterion being defined as repeated reception of the same metadata from the same information source, wherein after a last available information source has been selected and the abort criterion is met, discontinuing or suspending the searching for a predefined period of time, and then continuing with selection of another available information source other than the last available information source.

12. The method of claim 11, further including:

presenting a message when all available information sources have been searched without finding metadata that matches the user specified criteria.

13. A search arrangement for automatically searching at least one information source accessible through a data network, wherein the search arrangement comprises:

a receiver configured to select a connection to a selected information source from among a plurality of information sources and to receive content comprising useful information and metadata from the selected information source;

an analyzer configured to analyze the metadata received in respect of the at least one predefined criterion and, if the criterion is not satisfied, to generate and emit an activating signal that represents the dissatisfaction;

a computer processor configured to process the useful information received;

a controller configured to generate and transmit a control signal to the selected information source to change the content supplied by the selected information source, the controller being configured to be activated by the analyzer; and a computer memory configured to store the useful information while the associated metadata is still being analyzed, or while awaiting arrival of the associated metadata, wherein the stored useful information is discarded if the associated metadata indicates that the useful information does not satisfy the at least one predefined criterion, the processor is further configured to perform a determination that a received same metadata is received from a same information source from among the plurality of information sources, and in response to the determination, abort processing the useful information, and the analyzer is further configured to take into account an abort criterion, the abort criterion being defined as repeated reception of the same metadata from the same information source, wherein after the last available information source has been selected and the abort criterion is met, discontinuing or suspending the searching for a predefined period of time, and then continuing with selection of another available information source other than the last available information source.

* * * * *